March 24, 1953      A. J. HINTZE      2,632,520
APPARATUS FOR PRODUCING SEISMIC WAVES IN A BODY OF WATER
Filed Aug. 1, 1949

INVENTOR.
A. J. HINTZE

BY Hudson & Young
by: L. Malcolm Oberlin

ATTORNEYS

Patented Mar. 24, 1953

2,632,520

UNITED STATES PATENT OFFICE 2,632,520

APPARATUS FOR PRODUCING SEISMIC WAVES IN A BODY OF WATER

Alma J. Hintze, Bartlesville, Okla., assignor to Phillips Petroleum Company, a corporation of Delaware Application August 1, 1949, Serial No. 108,008

1 Claim. (Cl. 181—.5)

This invention relates to a method of and apparatus for producing seismic waves in a body of water.

Heretofore, seismic waves have been produced in water covered areas by detonating an explosive charge below the surface of the water, by detonating such charge at the surface of the ground underlying the water, or at a region below the ground. Difficulties are encountered in producing seismic waves in this manner due to the production of gas bubbles which oscillate or continuously expand as they rise through the liquid body. These gas bubbles produce spurious seismic waves which are incident upon the seismometers used in the survey, and produce a series of pulses which are converted into electrical voltages representative thereof by the seismometers. Due to the reflection and refraction of the spurious seismic waves thus produced, the seismometer output contains spurious voltage components which interfere with proper evaluation of the seismographic records. In addition, previous methods of detonating explosive charges in water covered areas are rather expensive and a considerable amount of time and effort is required to properly locate and detonate the explosive charge.

It is an object of the invention to provide a method of and apparatus for producing seismic signals in water covered areas which are free from the difficulties and inconveniences encountered with methods heretofore used.

It is a further object of the invention to produce a seismic wave without setting up spurious components due to rising of bubbles through the water.

Figure 1:
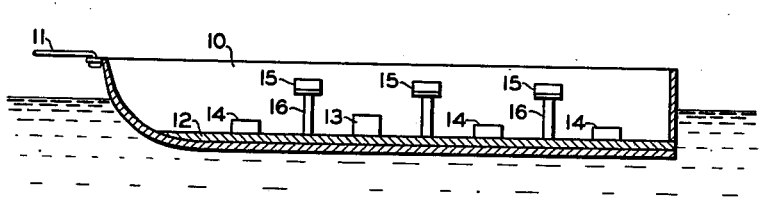
Figure 2:
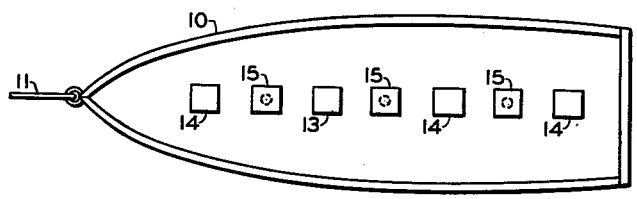

Various other objects, advantages and features of the invention will become apparent from the following description, taken in conjunction with the accompanying drawings, in which:

Figure 1 is a vertical sectional view of the apparatus for producing seismic waves; and Figure 2 is a top view of the apparatus shown by Figure 1.

Referring now to the drawings in detail, and particularly to Figure 1, I provide a heavy bottom barge or boat 10 which is adapted to be towed behind a power vessel by a line 11. Preferably and advantageously, the bottom of the boat is provided with a sheet 12 of explosion resistant metal, such as steel. The bottom of the boat is flat and presents an enlarged surface to the body of water upon which the boat floats.

In a preferred modification of the invention, a single explosive charge 13 is placed upon the bottom of the boat at approximately the central region thereof and, when it is desired to produce seismic waves, the explosive charge is detonated by passing an electrical current through a wire, not shown, which may conveniently form a part of tow line 11. Responsive to the detonation of charge 13, a pressure wave is produced which is propagated in all directions, the downward component of the explosion wave driving the flat bottom of the boat against the water over a large area thereof. In this manner, a seismic signal is produced without the simultaneous production of bubbles which produce spurious seismometer readings in the manner already explained. The pressure wave transmitted to the water through the bottom of the boat is of such character that the danger of killing fish or other marine life is greatly minimized, although the wave transmitted through the water produces accurate reflection and refraction patterns which yield valuable geological information concerning the strata underlying the water.

In a modification of the invention, a plurality of smaller charges 14 are placed in spaced arrangement upon the bottom of the boat and these charges are detonated simultaneously by electric currents applied through conductors, not shown, forming a part of the tow line 11. Ordinarily, the use of several spaced charges produces a more uniform seismic wave and improves the character of the signals picked up by the seismometers. The use of a plurality of charges has the further advantage that they may be detonated sequentially in certain instances where it is desirable to produce several seismic wave trains at spaced intervals and in a desired time relationship.

In still another modification of the invention, explosive charges 15 may be suspended in the air above the bottom of the boat by posts or supports 16. In this manner, detonation of the charges sets up an explosion wave in the air which is transmitted to the water through the bottom of the boat.

It will be apparent that the method and apparatus of the present invention enable successive charges to be fired with great rapidity and materially decrease the time required for positioning the charge over that required where the charge is lowered into the water or planted at the ground surface or subsurface. In addition, the production of bubbles is greatly minimized and the danger to marine life is substantially reduced.

While the invention has been described in connection with present, preferred embodiments thereof, it is to be understood that this description is illustrative only and is not intended to limit the invention, the scope of which is defined by the appended claim.

Having described my invention, I claim:

In combination, a boat floating upon a body of water, said boat having an elongated flat bottom, a sheet of reinforcing material secured to the bottom of said boat, a plurality of supports mounted upon the bottom of the boat and protruding upwardly therefrom, a plurality of spaced charges of explosive material mounted upon the respective supports and spaced from the bottom of the boat, a towing cable secured to the bow of said boat to tow same over said body of water, said cable incorporating electrical conductors connected to detonating means for said explosive charges, whereby passage of current through the conductors detonates the charges and produces a pressure wave which is transmitted through the bottom of the boat to the water, whereby the resultant movement of the bottom of the boat produces a seismic wave in the water upon which the boat is floating.

ALMA J. HINTZE.

REFERENCES CITED

The following references are of record in the file of this patent:

UNITED STATES PATENTS

| Number | Name | Date |
| --- | --- | --- |
| Re. 17,242 | McCollum | Mar. 19, 1929 |
| 1,827,371 | Rieber | Oct. 13, 1931 |
| 1,867,098 | Rieber | July 12, 1932 |
| 2,465,696 | Paslay | Mar. 29, 1949 |

OTHER REFERENCES

Boone, "Aerial Explosives," article in "The Explosives Engineer," Jan.-Feb. 1949, pages 7 to 10, 27, 28.